April 23, 1963  J. J. BLACK  3,087,051
MARKER LIGHTS FOR ROADWAY VEHICLES
Filed Aug. 11, 1960  4 Sheets-Sheet 1
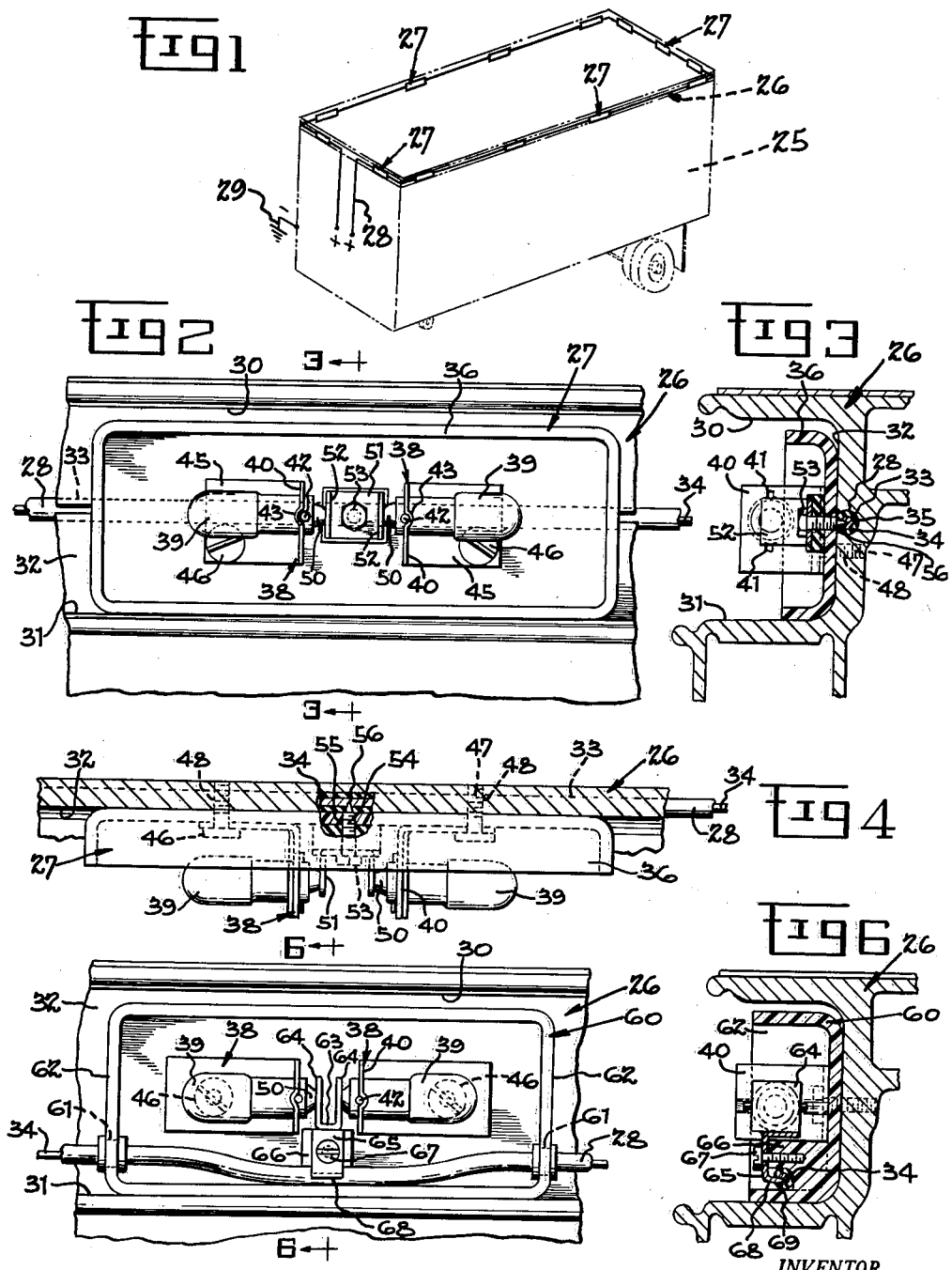
INVENTOR.
James J. Black.
BY
Wood, Herron & Evans
ATTORNEYS.

April 23, 1963 J. J. BLACK 3,087,051
MARKER LIGHTS FOR ROADWAY VEHICLES
Filed Aug. 11, 1960 4 Sheets-Sheet 2
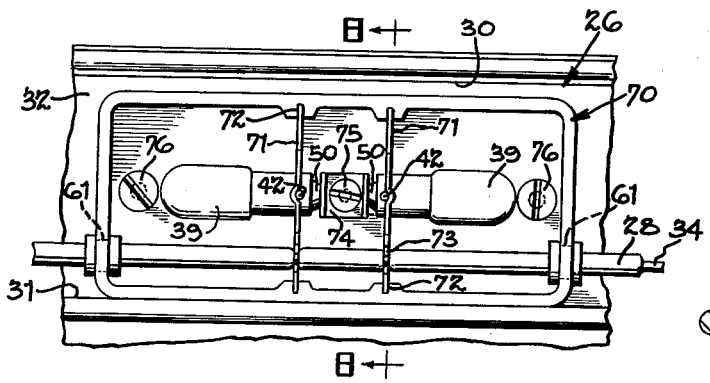
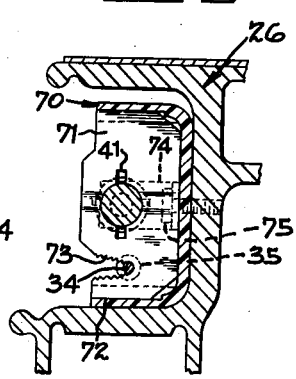
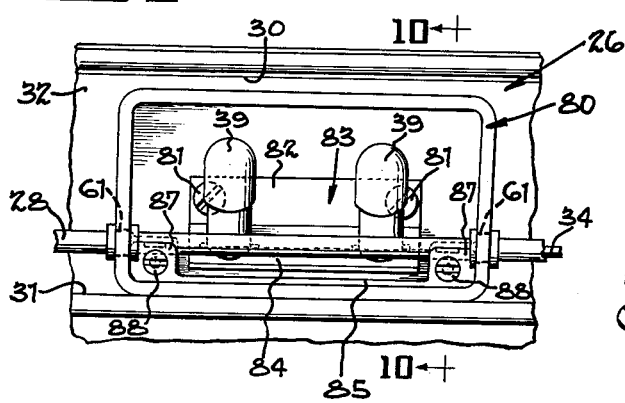
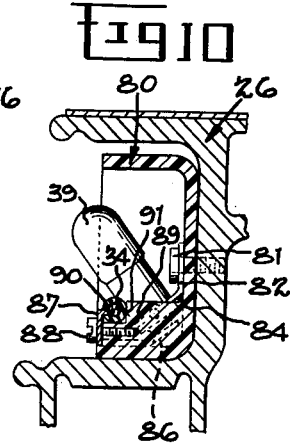
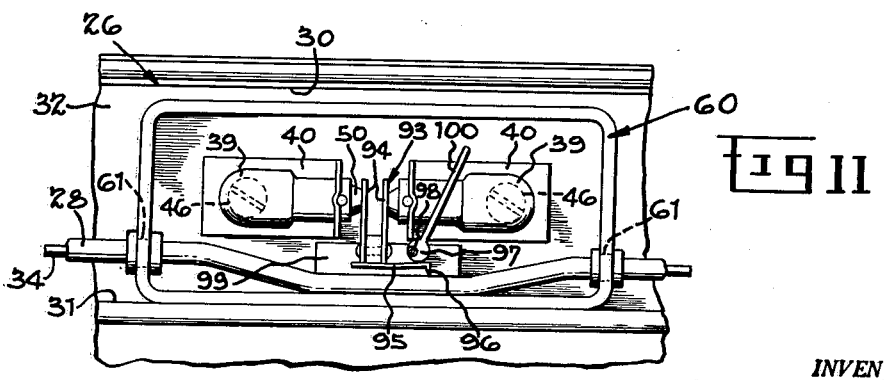
INVENTOR.
James J. Black.
BY Wood, Herron & Evans
ATTORNEYS.

April 23, 1963   J. J. BLACK   3,087,051
MARKER LIGHTS FOR ROADWAY VEHICLES
Filed Aug. 11, 1960   4 Sheets-Sheet 3
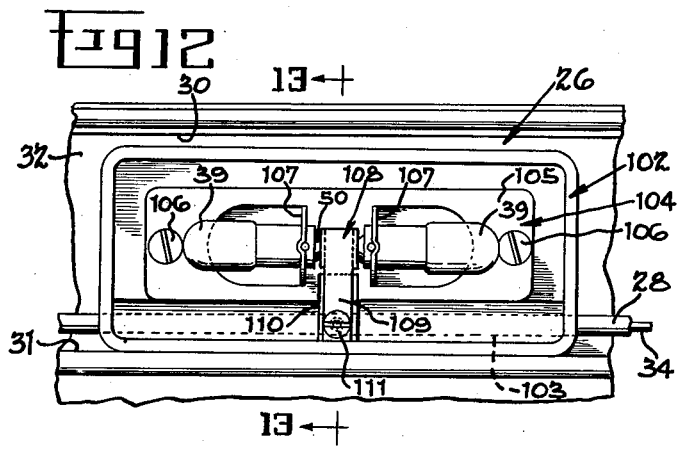
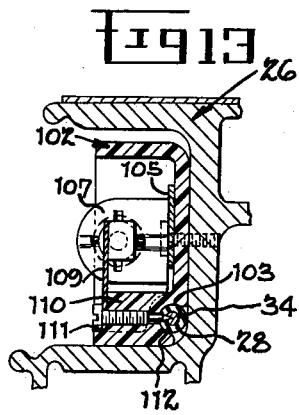
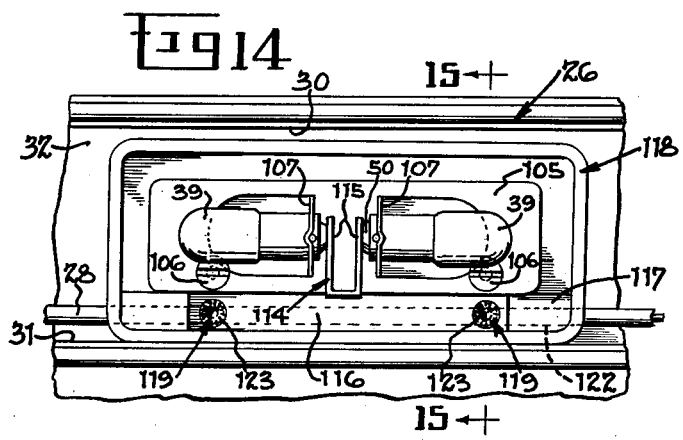
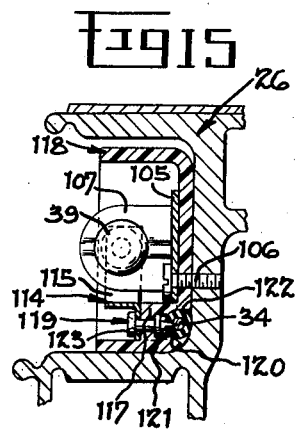
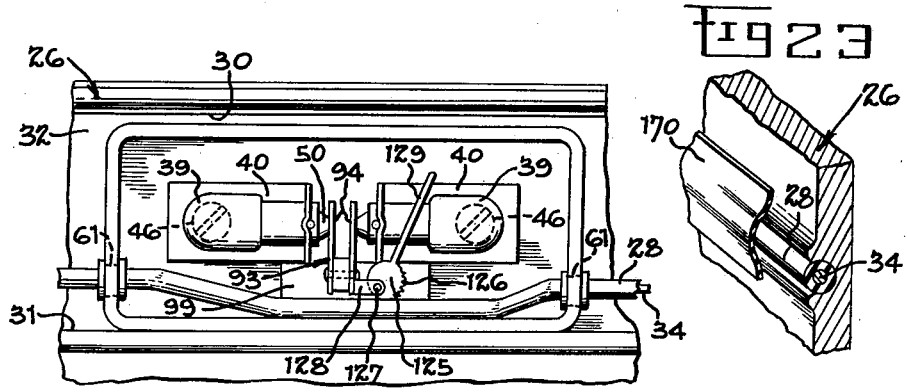
INVENTOR.
James J. Black.
BY Wood, Herron & Evans.
ATTORNEYS.

April 23, 1963  J. J. BLACK  3,087,051
MARKER LIGHTS FOR ROADWAY VEHICLES
Filed Aug. 11, 1960  4 Sheets-Sheet 4
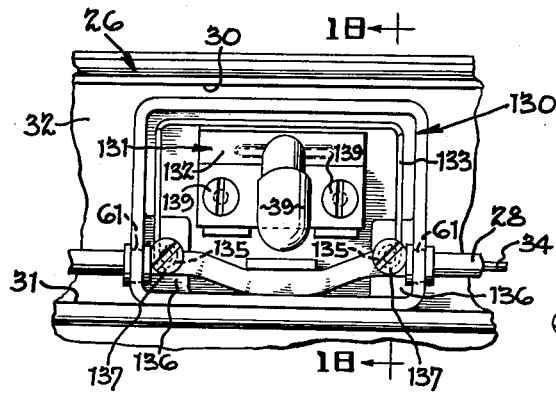
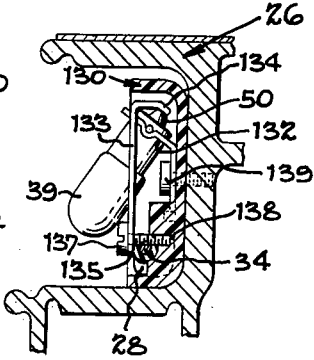
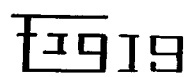
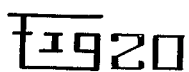
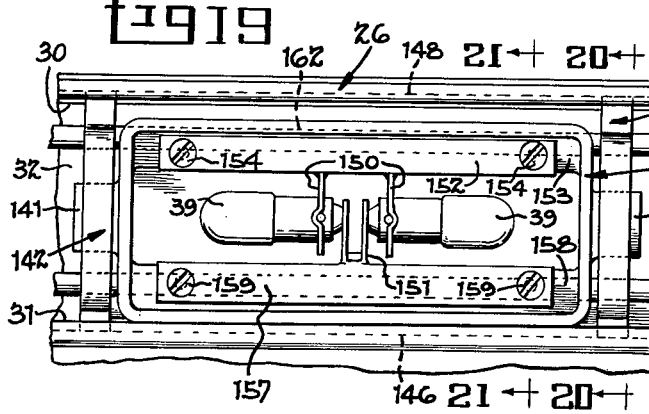
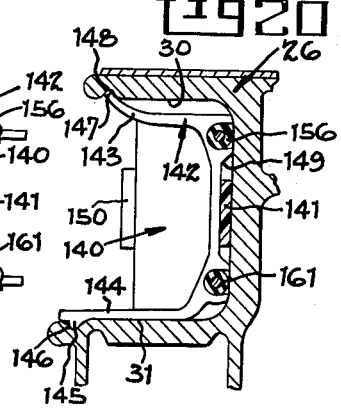
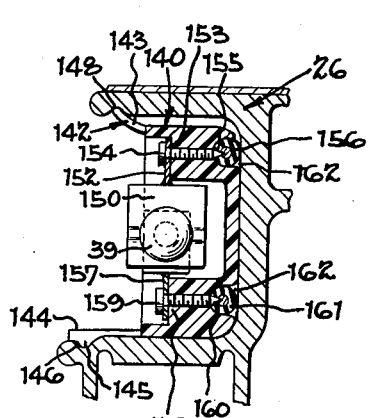
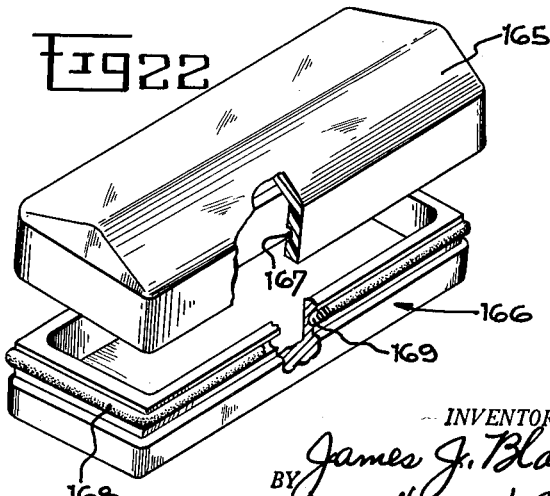
INVENTOR.
James J. Black.
BY Wood, Herron & Evans.
ATTORNEYS.

United States Patent Office 3,087,051
Patented Apr. 23, 1963

3,087,051
MARKER LIGHTS FOR ROADWAY VEHICLES
James J. Black, Cincinnati, Ohio, assignor, by mesne assignments, to Pullman Incorporated, a corporation of Delaware
Filed Aug. 11, 1960, Ser. No. 49,096
3 Claims. (Cl. 240—7.1)

This invention relates to clearance marker lights for roadway vehicles and is directed to improvements by which the installation of such lights is facilitated.

The practice of mounting marker lights on cargo bodies has been to employ marker lights each having a pigtail, lead wire or terminal which must be connected into an electrical circuit about the upper edge or quarter panel of a cargo body. The process of making electrical connections for each individual marker light has been a time consuming process which the present invention seeks to avoid.

For example, in installing marker lights prior to this invention a cable was positioned about the interior or exterior of a trailer on the upper quarter panel. The cable, when in position, would probably be ten or twelve feet above ground level. Marker lights having pigtails extending from the marker light housing were mounted in their proper positions about the quarter panel. Thereafter the cable was stripped of its insulation along a short length adjacent each marker light and a soldered connection was made between the pigtail and the cable core. This connection had to be wrapped in suitable insulating moisture resistant material so as to avoid a short circuit in the marker light system. It should be bore in mind that all this time the workman was required to be in a relatively awkward position on a ladder, scaffold or the like in order to be in position near the top of the cargo body to make the electrical connections.

From time to time it is necessary to add marker lights to those already installed, or some trucking companies prefer to have their semi-trailers provided with more lights than others. The installation of additional marker lights to an already existing electrical circuit mounted on a semi-trailer quarter panel is a considerably more awkward and time consuming process than the original installation. The cable is not as accessible as it is for the original installation. In order to balance the disposition of the lights, certain of those lights originally installed must be disconnected and relocated with the added requirement of insulation stripping, soldering and wrapping.

The present invention provides an improved construction for clearance marker lights particularly insofar as the construction relates to the manner in which the marker lights are assembled relative to the current supplying cable. In accordance with this invention, the pigtail connection is eliminated and an improved mode of connection is utiing a threaded fastener into the cable or by forcing the conveniently electrically connected into the wiring system as an incident to physical emplacement and fastening of the lights upon the roadway equipment all with an ease and economy which has been heretofore unattainable.

More specifically the present invention provides an electrical circuit and marker light construction in which at least one generally continuous current insulated carrying cable is positioned around the upper quarter panel of a cargo body, and in which the marker lights have electrically conductive sharp projections which are positionally related to the cable and marker light locations so as to pierce the insulation of the cables and to form therewith the electrical connection of the marker light to the current carrying cable core.

In forming an electrical connection by piercing through the cable insulation, as permitted by the positional relationship of the marker light and its sharp projection to the cable, the operations of stripping cable and soldering pigtails are completely eliminated. Marker light position changes can be made with facility for the disconnecting of the marker light from the cable is no more difficult than connecting the marker light.

The invention admits of many different marker light structures as will appear below, each structure having certain desirable characteristics and all structure having the advantage of simplified installation.

In various embodiments of the marker light structures of the present invention only one electrical connection to the circuit need be made by piercing the cable as described while the other electrical connection is made by the screw which mounts the marker light to a quarter panel which has been electrically grounded. It is with the scope of the invention, however, to provide a two cable circuit in which the act of securing or snapping the marker light into position effects the piercing of the cables to make the electrical connection.

The manner in which the cable is mounted is also subject to variation. For example, the cable may pass through the marker light housing, it may be disposed in an external groove under the marker light housing or it may be disposed in a groove formed in the quarter panel.

The cable may be pierced by the motion of the marker light as an incident to its being fastened to the quarter panel, the marker light having an electrically conductive projection extending outside of its housing. Alternatively, the cable piercing means may be disposed within the box and housing may be secured to the cable passing through the housing by caming a projection into the cable, driving a threaded fastener into the cable or by forcing the cable onto a notched electrically conductive connector.

The several variations in the structural features of the invention with their attendant advantages will become more readily apparent from the following detailed description taken in conjunction with the accompanying drawings in which:

FIG. 1 is a diagrammatic perspective view of a cargo body employing the invention.

FIG. 2 is a plane view of one form of marker light according to the invention.

FIG. 3 is a cross sectional view taken along line 3—3 of FIG. 2 thereof.

FIG. 4 is a side elevational view partly in section of the embodiment of FIG. 2.

FIG. 5 is a plane view of an alternative embodiment of FIG. 4.

FIG. 6 is a cross sectional view taken along lines 6—6 of FIG. 5.

FIG. 7 is a plane view of another embodiment.

FIG. 8 is a cross sectional view taken along lines 8—8 of FIG. 7.

FIG. 9 is a plane view of still another alternative embodiment.

FIG. 10 is a cross sectional view taken along lines 10—10 of FIG. 9.

FIG. 11 is a plane view of still another alternative embodiment.

FIG. 12 is a plan view of still another alternative embodiment.

FIG. 13 is a cross sectional view taken along lines 13—13 of FIG. 12.

FIG. 14 is a plan view of still another alternative embodiment.

FIG. 15 is a cross sectional view taken along lines 15—15 of FIG. 14.

FIG. 16 is a plan view of still another alternative embodiment.

FIG. 17 is a plan view with still another alternative embodiment.

FIG. 18 is a cross sectional view taken along lines 17—17 of FIG. 17.

FIG. 19 is a plan view of still another alternative embodiment.

FIG. 20 is a cross sectional view taken along lines 19—19 of FIG. 19.

FIG. 21 is a cross sectional view taken along lines 21—21 of FIG. 19.

FIG. 22 is a disassembled perspective view of a housing and lens for a marker light, and FIG. 23 is a fragmentary perspective view of a cable installation.

The invention will be described herein with particular reference to the installation of marker lights in the upper quarter panel of a semi-trailer type roadway vehicle. The upper quarter panel is that structural section which extends along the upper edge corner of the cargo body.

As shown in FIG. 1, the cargo body 25 for a semi-trailer or the like has an upper quarter panel 26 on which the marker lights 27 are mounted. In the embodiment shown, the marker lights have light bulbs which are energized through a circuit consisting of a cable 28 extending around the top of the cargo body 25 and a ground connection 29 formed by the cargo body.

The invention is directed in part to the structure by which the marker lights are mounted on the quarter panel and are connected to such a cable 28, the structure utilizing the grounded quarter panel to complete the electrical circuit. In an alternative form of the invention two cables are mounted around the quarter panel, one of the cables providing a ground connection and the other cable forming the line connection.

*Figs 2 to 4*

One marker light constructed in accordance with the invention is illustrated in FIGS. 2-4. Here the quarter panel 26 is formed to provide a recess having side walls 30 and 31 and a bottom wall 32. A generally circular groove 33 is formed in the bottom wall as a seat to receive the cable 28. The cable may be of conventional structure having a metallic current conducting core 34 surrounded by insulation 35. The embedded cable and groove opening may be covered by a pressure sensitive tape as shown in FIG. 23, to be discussed below.

The marker light 27 illustrated in FIGS. 2-4 is one of a plurality of marker lights which are identical and which are to be spaced along the quarter panel and connected to the cable 28 so as to be in electrical communication with the cable core 34. Each marker light has a generally rectangularly-shaped housing 36 of insulated material which is adapted to receive a lens of translucent material through which light from one or more light bulbs can pass. The lens can be mounted in any suitable manner for example as shown in FIG. 22 to be discussed below.

The housing 36 contains one or more bayonet type sockets 38 which receive one or more light bulbs 39. Each socket comprises an apertured ground termianl 40 having slots 41 through which lugs 42 on the light bulb 39 may pass. The terminal 40 is recessed as at 43 to form grooves into which the lugs 42 will be disposed when the lamp bulb is in its seated position.

The ground terminal 40 has a base portion 45 through which a metallic screw 46 passes, the metallic screw 46 being threaded at 47 to cooperate with a threaded bore 48 in the quarter panel. The screw 47 serves to secure the marker light 27 to the quarter panel and forms an electrical connection to ground between the ground terminal 40 and the cargo body which is grounded at 29.

Each light bulb 39 is terminated at the base portion in a contact 50 which bears against a line terminal 51. The line terminal 51 is formed of resilient sheet metal which normally urges the lugs 42 of the light bulb into the seating grooves 43. In the embodiment illustrated the line terminal is U-shaped to provide outwardly projecting flanges 52 against which the contact 50 bears to form an electrical connection. The line terminal 51 is secured to the housing by a screw 53 which is threaded at 54 to cooperate with a threaded aperture 55 in the bottom of the housing 36. The screw has a sharp projection or point 56 which, as illustrated in FIGS. 3 and 4, passes through the cable insulation 35 and is embedded in the cable core 34 to form an electrical contact therewith. Current passing through the cable core will illuminate each light bulb through a circuit comprising the screw 53, line terminal 51, light bulb contact 50, pins 42, ground terminal 40, screw 46 and grounded quarter panel 26.

In assembling the unit to the quarter panel and cable 28 the screw 53 and line terminal 51 are in position in the housing 36. The housing is brought into engagement with the quarter panel so that the screws 46 are in alignment with the respective bores 48 in the quarter panel. As the screw 46 are tightened, the point 56 of the screw 53 embeds itself in the cable insulation and core to form the electrical connection. Thus, in assembling, nothing is required other than aligning and fastening the screws 46 in their proper position.

Similar connections to the current conducting cable are made in the embodiments described below. For simplification like elements will have like numerals applied thereto.

*FIGS. 5 and 6*

In the embodiment of FIGS. 5 and 6, a housing 60 has apertures 61 in the end walls 62 thereof. The cable 28 is threaded through the aperture and has a portion thereof lying within the housing 60. Light bulbs 39 are positioned in bayonet type sockets 38 formed by a ground terminal 40 which are connected by screws 46 to the grounded quarter panel 26. A U-shaped line terminal 63 has two legs 64 which are in electrical contact with the contact 50 on each bulb 39. The line terminal 63 is integral with a metallic strip 65 which is secured to an insulated post 66 molded as an integral part of the housing 60. The strip 65 may be secured to the post by a screw 67. The strip has a flange 68 (FIG. 6) which is terminated in a sharp point 69. The sharp point 69, when the unit is in its assembled condition, is embedded in the cable insulation 33 and the cable core 34.

In assembling the unit of FIGS. 5 and 6, each marker light is brought to its required position with the screws 46 in alignment with cooperating bores in the quarter panel. Each unit is secured to the quarter panel by turning the screws. The cable 28 is threaded through the mounted marker lights, and the section within each housing is positioned alongside the post 66. The line terminal 63 is brought into position on post 66 and is secured thereto by turning screw 67. As the screw is tightened, the sharp projection 69 on the flange 68 is brought into embedded engagement with the cable insulation 33 and core 34.

*FIGS. 7 and 8*

In the embodiment of FIGS. 7 and 8 as distinguished from the embodiment described above, the bayonet connection forms the line terminal and is in engagement with the lugs 42 of the light bulb 39. The bayonet connection comprises two plates 71 which are embedded at 72 in the walls of the housing 70 and are provided with saw-toothed edge slots 73. The section of cable which passes through apertures 61 in the housing 70 and lies within the housing is forced down upon the saw-toothed edges of the slot 73 so that the projections penetrate the cable insulation 35 and engage the current conducting core 34. The light bulb contacts 50 are in engagement with a U-shaped ground terminal 74 which is connected by means of a screw 75 to the quarter panel 26. Screws 76 secure the housing 70 to the quarter panel.

In assembling the marker light of FIGS. 7 and 8, the housing 70 may be first installed on the quarter panel by means of the screws 76 and the ground terminal 74 can be mounted within the housing and connected to the grounded quarter panel by means of the screw 75. Thereafter the cable 28 may be threaded through the apertures 61 in each of the several housings 70 mounted around the quarter panel. Electrical connection of the line terminals 71 to the cable 28 is made simply by pressing the cable into the slots 73 so that the sharp projections formed by the saw-toothed edge of the slot 73 becomes embedded in the insulation and the conductive core 34.

FIGS. 9 and 10

In the embodiment of FIGS. 9 and 10 a housing 80 is secured to the quarter panel 26 by a pair of screws 81. The screws pass through the flange 82 on the ground terminal 83 and connect the ground terminal to the grounded quarter panel 26. The ground terminal 83 has an inclined portion 84 which is apertured to form the bayonet connection for the light bulbs 39. A line terminal 85 is formed by an inclined plate 86 (FIG. 10) which is positioned below the inclined portion 84 of the ground terminal 83. The line terminal 85 is provided with tabs 87 at its ends, the tabs being mounted by screws 88 on posts 89 which are molded integrally with the housing 80. The tabs 87 have downwardly extending sharp projections 90 which are embedded in the cable 28 to form electrical contact with the core 34. The cable rests on a shoulder 91 formed in the post 89.

In assembly, the housings 80 are mounted by means of the screws 81 in their proper positions on the quarter panel. The cable 28 is threaded through aperture 61 in the housing 80 so that a section of the cable within the housing rests on the shoulders 91. Thereafter each line terminal 85 is placed in its proper position and screws 88 are applied. The application of the screws 88 forces the sharp projections 90 into embedded engagement with the cable 28, thereby providing the electrical connection of the line terminal 85 with the current conducting core 34 of cable 28.

FIG. 11

The embodiment of FIG. 11 is similar in many respects to that of FIGS. 5 and 6. The housing 60 is apertured as at 61 and has its ground terminals 40 formed and mounted in an identical manner. In this embodiment, however, a line terminal 93 is formed by two metallic strips 94 electrically connected by a flexible strip 95 having a sharp projection 96 which is embeddable in the cable 28 to form an electrical connection with the core thereof. A cam 97 is eccentrically pivoted at 98 to an insulative block 99 which is integral with the housing 60. An arm 100 on the cam 97 is employed to rotate the cam about its pivot 98 to force the sharp projection 96 into the cable.

In assembling, the marker light of FIG. 11 is mounted on the grounded quarter panel 26 and thereafter the cable 28 is threaded through the apertures 61. When the cable is in proper position, arm 100 is pivoted to force the projection 96 into engagement with the core of the cable 28 and to provide an electrical connection between the line terminal strips 94 and the current conducting cable.

FIGS. 12 and 13

In FIGS. 12 and 13, a housing 102 has a groove 103 in the bottom outside surface thereof in which the cable 28 is lodged. A ground terminal 104 is formed by a plate 105 secured by screws 106 to the grounded quarter panel 26, the screws also serving to mount the housing 102 in the proper position on the quarter panel. Terminal strips 107 are struck from the plate 105 to project normal to the plate, the strips 107 being formed with a bayonet type aperture to receive the light bulbs 39.

The contacts 50 in the light bulb 39 bear against the inwardly projecting legs of a U-shaped terminal strip 108. The terminal strip 108 has an extension 109 which rests on a post 110 of insulative material molded integrally with the housing 102 and is secured thereto by a screw 111. The screw 111 has a sharp point 112 (FIG. 13) which is embedded in the cable 28.

In assembling the marker lights of the embodiment of FIGS. 12 and 13, the cable 28 is laid in proper position on the quarter panel and the marker lights are secured in the quarter panel by the screws 106. If the screw 111 has been previously mounted in the housing, the clamping action of the screws 106 on the housing 102 forces the projecting point 112 into embedded engagement with the cable 28 thereby completing the electrical connection between the conductive core 34 and the terminal strip 108. Alternatively, the terminal strip 108 could be mounted after the housing 102 has been installed, the mounting of the strip 108 causing the screw to become embedded in the cable 28.

FIGS. 14 and 15

The embodiment of FIGS. 14 and 15 is quite similar to the embodiment of FIGS. 12 and 13. In that embodiment, however, the line terminal 114 is formed by a U-shaped strip 115 which is integral with a flat strip 116, the flat strip resting on a shelf 117 molded integrally with the housing 118. The strip 116 is secured on the shelf 117 by a pair of rivets 119 each rivet being provided with a sharp point 120. Each rivet has a shoulder 121 which bears against the surface of a groove 122 in the bottom external surface of housing 118. When the strip 116 is in place the rivet is headed as at 123 to secure the strip on the shelf.

The assembly of the marker lights of FIGS. 14 and 15 is similar to that described in connection with FIGS. 12 and 13. The cable 28 is laid in position and the housing is placed over the cable with the cable being lodged in the groove 122. The housing is secured in its position by means of the screws 106 which also serve to connect the ground terminal plate 105 to the grounded quarter panel 26. As the screws 106 are tightened, the sharp projections 120 on rivets 119 are brought into imbedded engagement with the core 34 of the cable thereby providing a line connection of terminal 114 to the current conducting core 34.

FIG. 16

The embodiment of FIG. 16 is substantially identical to the embodiment of FIG. 11 except for the manner in which the line terminal is brought into electrical connection with the conducting core 34 of the cable 28. In the embodiment of FIG. 16, a disc 125 having a serrated edge 126 forming sharp projections is eccentrically pivoted at 127 to a bracket 128 on the line terminal 93. An arm 129 integral with the disc 125 serves to rotate the disc about the pivot 127 to bring the serrated edge 126 into embedded engagement with the current conducting core 34 of the cable 28.

The assembly of the marker light of FIG. 16 is identical to that of the embodiment of FIG. 11 except for the manner in which the line terminal 93 is connected to the cable, the manner of connection being described above.

FIGS. 17 and 18

In FIGS. 17 and 18 a housing 130 has apertures 61 through which the cable 28 passes. A ground terminal 131 has an inclined portion 132 which is formed with a bayonet type aperture to receive a light bulb 39. Screws 139 secure the ground terminal 131 and housing 130 to the quarter panel 26 and form the connection of the ground terminal 131 with the grounded quarter pane. The contact 50 of the light bulb engages a generally U-shaped wire 133 at the inwardly directed bight portion 134 thereof. The ends of the conductive wire 133 are bent to form eyes 135, the eyes being secured to posts 136 by means of screws 137. The screws 137 have sharp projections 138 which permit the screws to be embedded in the cable 28 thereby bringing the core 34 thereof into electrical communication with the wire 133 which forms the line termnal.

The marker light of FIGS. 17 and 18 is secured to the quarter panel 26 in the proper position and the cable 28 is threaded through the apertures 61. Thereafter the wire 133 is screwed onto the posts 136 by the screws 137 during which step the screws embed themselves in the cable to complete the electrical circuit.

*FIGS. 19, 20 and 21*

In the embodiment of FIGS. 19, 20 and 21, no ground connection is employed. Rather, a second cable is provided to complete the circuit to the terminals.

More particularly, a housing 140 having longitudinal projections 141 extending from the ends of the housing 140 is disposed within the channel-shaped quarter panel 26. The housing 140 is secured in the quarter panel by U-shaped securing members 142 which have legs 143 and 144. The leg 144 has a detent 145 lodged in a groove 146 in the side wall 31 of quarter panel 26. The leg 143 is resilient and the end thereof 147 projects into a groove 148 in the side wall 30 of the quarter panel. Because of the resilient of the leg 143, the securing member 142 can be snapped into the position illustrated so that the securing member overlies the projection 141, a recess 149 being provided in the bottom of the securing member for that purpose.

Within the housing 140, sockets for light bulbs 39 are formed by bayonet terminals 150 and end contact terminals 151. The terminals 150 are integral with strips 152 secured to a shelf 153 molded integrally with the housing 140 by means of screws 154 having sharp points 155 embedded in the cable 156.

Similarly, the terminals 151 are integral with a strip 157 resting on a shelf 158 molded integrally with a housing 140. The strip 157 is secured on the shelf by means of screws 159 having sharp points 160 which are embedded in a second cable 161.

The marker lights of FIG. 19 are mounted on the quarter panel after the two cables 156 and 161 have been properly positioned on the quarter panel. Each housing 140 is brought into position with the housing overlying the cables 156 and 161, the housing having grooves 162 in the bottom external wall thereof to receive the two cables. As the housing is pressed into position so that the cables will lodge in the grooves 162, the projecting points of the screws 154 and 159 will be embedded in the cables to form an electrical connection with the cores thereof. Thereafter, the securing members 142, located at each end of the housing 140 are snapped into position to retain the marker light in the channel-shaped quarter panel.

As indicated above, the marker lights will be provided with a translucent lens, one such lens being shown at 165 in FIG. 22. The lens may be secured to the marker light housing indicated at 166 in any suitable manner. In the preferred form of the invention, the lens 165 has a groove 167 extending around the inside wall thereof. The groove 167 cooperates with an O ring 168 which is disposed in a groove 169 around the outside wall of the housing 166. The lens 165 is fitted in an assembled position merely by snapping it down over the O ring so that the O ring lodges in the groove 167.

When the quarter panel 26 is formed with a groove to receive the cable 28, for example as shown in connection with the embodiment of FIGS. 2–4, it may be found advisable to enclose the cable with a pressure sensitive tape 170 such as is shown in FIG. 23. The tape helps retain the cable in the groove against the road vibrations which tend to dislodge it, and at the same time protects the cable from rain and dew which would tend to cause short circuits.

As can be seen from the description above, the invention is subject to many variations, several of which have been shown and described. It should be understood that further variations can be developed without departing from the spirit and scope of the invention as defined in the accompanying claims.

I claim:

1. Apparatus comprising, a metallic cargo body having an elongated groove therein, at least one elongated insulated cable mounted in said groove, a plurality of lamp housings, each of said lamp housings having at least an insulative base in contact with said cargo body, at least one electrically conductive fastener extending through said base and into the cargo body for mounting each said lamp housing on said cargo body, said lamp housings overlying said groove, two electrically conductive terminals in each said housing for receiving a light bulb, one of said terminals being in electrical contact with said fastener, a sharp electrically conductive projection extending through said housing and electrically connected to the other of said terminals and piercing through the insulation of said cable into electrical contact with the cable therein.

2. The apparatus defined in claim 1 and further including a pressure sensitive tape overlying said cable and secured to said cargo body to cover said groove.

3. Apparatus comprising a metallic cargo body having at least one elongated insulated cable mounted on said cargo body, a source of power connected at one side to said cargo body, and means for connecting said cable to the other side of said source of power, a plurality of marker lights, each of said marker lights comprising a lamp housing having at least an insulative base in engagement with said cargo body, at least one electrically conductive fastener extending through said base and into the cargo body for mounting said lamp housing on said cargo body, two electrically conductive terminals in said housing for receiving a light bulb, a sharp electrically conductive projection extending from one of said terminals for piercing through the insulation of said cable and into electrical contact with the cable therein and means connecting the other of said terminals to said conductive fastener.

References Cited in the file of this patent

UNITED STATES PATENTS

| | | |
|---|---|---|
| 1,752,662 | Eckstein | Apr. 1, 1930 |
| 2,255,273 | Sauer | Sept. 9, 1941 |
| 2,609,415 | Benander et al. | Sept. 2, 1952 |
| 2,724,769 | D'Arbeloff | Nov. 22, 1955 |
| 2,745,094 | Harrington et al. | May 8, 1956 |
| 2,806,940 | Worden | Sept. 17, 1957 |
| 2,855,498 | Knapp | Oct. 7, 1958 |
| 2,860,233 | Johnson | Nov. 11, 1958 |
| 2,991,116 | Andrews | July 4, 1961 |